United States Patent
Robinson et al.

(10) Patent No.: US 10,582,331 B2
(45) Date of Patent: Mar. 3, 2020

(54) DYNAMIC POSITIONAL AUDIO

(71) Applicant: Comcast Cable Communications, LLC, Philadelphia, PA (US)

(72) Inventors: Chris Robinson, Monument, CO (US);
Shawn Kercher, Parker, CO (US);
Derek Johnson, Sedalia, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 15/898,014

(22) Filed: Feb. 15, 2018

(65) Prior Publication Data
US 2019/0028830 A1    Jan. 24, 2019

Related U.S. Application Data

(63) Continuation of application No. 15/178,131, filed on Jun. 9, 2016, now Pat. No. 9,930,471, which is a continuation of application No. 14/467,751, filed on Aug. 25, 2014, now Pat. No. 9,392,368.

(51) Int. Cl.
| | |
|---|---|
| *H04R 3/12* | (2006.01) |
| *H04S 7/00* | (2006.01) |
| *H04R 5/04* | (2006.01) |
| *G06F 3/16* | (2006.01) |
| *H04R 3/00* | (2006.01) |

(52) U.S. Cl.
CPC ............. *H04S 7/308* (2013.01); *G06F 3/165* (2013.01); *H04R 3/12* (2013.01); *H04R 5/04* (2013.01); *H04S 7/303* (2013.01); *H04R 3/005* (2013.01); *H04R 2227/005* (2013.01); *H04R 2400/03* (2013.01)

(58) Field of Classification Search
None
See application file for complete search history.

(56) References Cited

U.S. PATENT DOCUMENTS

| | | | |
|---|---|---|---|
| 6,097,558 | A | 8/2000 | Oguro |
| 6,272,082 | B1 | 8/2001 | Ishii et al. |
| 7,730,512 | B2 | 6/2010 | Yurt |
| 8,315,412 | B2 | 11/2012 | Strait et al. |
| 8,884,736 | B1 | 11/2014 | Gravino et al. |
| 9,191,914 | B2 | 11/2015 | Kennedy et al. |
| 9,392,368 | B2 | 7/2016 | Robinson et al. |
| 9,930,471 | B2 | 3/2018 | Robinson et al. |
| 2002/0141597 | A1 | 10/2002 | Wilcock |

(Continued)

OTHER PUBLICATIONS

U.S. Appl. No. 61/786,680, filed Mar. 15, 2013, Christopher Kennedy.

(Continued)

*Primary Examiner* — Peter Vincent Agustin
(74) *Attorney, Agent, or Firm* — Ballard Spahr LLP

(57) ABSTRACT

System and methods for providing dynamic positional audio are disclosed. Methods can comprise determining availability of one or more devices to output audio and determining a location of the one or more available devices. Audio information can be received and at least a portion of the audio information can be configured to generate assigned audio information based on the determined location of the available devices. The assigned audio information can be transmitted to the available devices.

20 Claims, 7 Drawing Sheets

(56) References Cited

U.S. PATENT DOCUMENTS

| | | |
|---|---|---|
| 2003/0014486 A1 | 1/2003 | May |
| 2004/0117461 A1 | 6/2004 | Nakayama et al. |
| 2005/0253807 A1 | 11/2005 | Hohmann et al. |
| 2006/0088149 A1 | 4/2006 | Sung |
| 2006/0226977 A1 | 10/2006 | DeLozier et al. |
| 2008/0051154 A1 | 2/2008 | Schlomann et al. |
| 2008/0281601 A1 | 11/2008 | Reichardt et al. |
| 2009/0110212 A1 | 4/2009 | Iwasaki |
| 2009/0226008 A1 | 9/2009 | Takanezawa |
| 2012/0060176 A1 | 3/2012 | Chai et al. |
| 2012/0269351 A1 | 10/2012 | Sato et al. |
| 2013/0218688 A1 | 8/2013 | Roos |
| 2013/0230186 A1 | 9/2013 | Li et al. |
| 2014/0112506 A1 | 4/2014 | Hopkins |
| 2014/0185843 A1 | 7/2014 | Kim |
| 2014/0274147 A1* | 9/2014 | Kennedy ............... H04W 64/00 455/456.3 |
| 2015/0003636 A1 | 1/2015 | Shear |
| 2015/0010169 A1 | 1/2015 | Popova |
| 2015/0071449 A1 | 3/2015 | Ozcan |
| 2015/0189438 A1 | 7/2015 | Hampiholi et al. |
| 2016/0057537 A1 | 2/2016 | Robinson et al. |
| 2016/0366533 A1 | 12/2016 | Robinson et al. |

OTHER PUBLICATIONS

U.S. Appl. No. 14/151,448 (U.S. Pat. No. 9,191,914), filed Jan. 9, 2014 (Nov. 17, 2015), Christopher Kennedy.
U.S. Appl. No. 14/878,738, filed Oct. 8, 2015, Christopher Kennedy.
U.S. Appl. No. 14/467,751 (U.S. Pat. No. 9,392,368), filed Aug. 25, 2014 (Jul. 12, 2016), Chris Robinson.
U.S. Appl. No. 15/178,131 (U.S. Pat. No. 9,930,471), filed Jun. 9, 2016 (Mar. 27, 2018), Chris Robinson.

* cited by examiner

DYNAMIC POSITIONAL AUDIO

CROSS REFERENCE TO RELATED APPLICATION

This application is a continuation of U.S. Non-Provisional application Ser. No. 15/178,131 filed Jun. 9, 2016, issued as U.S. Pat. No. 9,930,471 on Mar. 27, 2018, which is a continuation of U.S. Non-Provisional application Ser. No. 14/467,751 filed Aug. 25, 2014, issued as U.S. Pat. No. 9,392,368 on Jul. 12, 2016, which are both herein incorporated by reference in their entirety.

BACKGROUND

Users often change locations while interacting with one or more devices. For example, users can use a wireless device to communicate with a network (e.g., cellular network, Wi-Fi network, local area network, Internet, audio network, etc.), while changing location. As another example, users can move from room-to-room within a local network at a premises, and as the location of the user changes, the performance of the network (e.g., audio network) can have a perceived change from the perspective of the user. A user's perception of audio, for example, is variable based upon the source(s) of content, e.g., the configuration of the speakers within the room and premises. These and other shortcomings of the prior art are addressed by the present disclosure.

SUMMARY

It is to be understood that both the following summary and the following detailed description are exemplary and explanatory only and are not restrictive. In an aspect, provided are methods and systems for automatically personalizing a user experience based upon a user location. The systems and methods provided can enable, for example, a device or system to recognize the presence of a specific user and then adjust various parameters that define a user experience. As another example, one or more devices can be automatically activated based upon a location of a user. In a certain aspect, any addressable device with audio output capability can be configured as part of an ad hoc audio system. As an example, the available addressable audio-capable devices can be automatically detected or manually specified. Once specified, the audio-capable devices can be managed to control the specific audio information that is transmitted to each audio-capable device. For example, balance levels and location-specific audio information (e.g., surround sound encoded audio information) can be automatically managed across all specific audio-capable devices to provide the user experience.

In an aspect, methods can comprise determining a plurality of available devices to output audio. A first location of a first device and a second location of a second device of the plurality of available devices can be determined. Audio information can also be received. First assigned audio information can be generated based on the received audio information and the first location. Second assigned audio information can be generated based on the received audio information and the second location. The first assigned audio information can be transmitted to the first device of the plurality of available devices and the second assigned audio information can be transmitted to the second device of the plurality of available devices.

In an aspect, methods can comprise determining availability of a device to output audio and determining a location of the available device. Audio information can be received and at least a portion of the audio information can be configured to generate assigned audio information based on the determined location of the available device. The assigned audio information can be transmitted to the available device.

In an aspect, methods can comprise determining a first location of a first device and a second location of a second device. The first device can be associated with a first audio channel based on the first determined location. The second device can be associated with a second audio channel based on the second determined location. Audio information can be received and first assigned audio information can be generated based on the received audio information and an audio characteristic associated with the first audio channel. Second assigned audio information can be generated based on the received audio information and an audio characteristic associated with the second audio channel. The first assigned audio information can be transmitted to the first device. The second assigned audio information can be transmitted to the second device.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
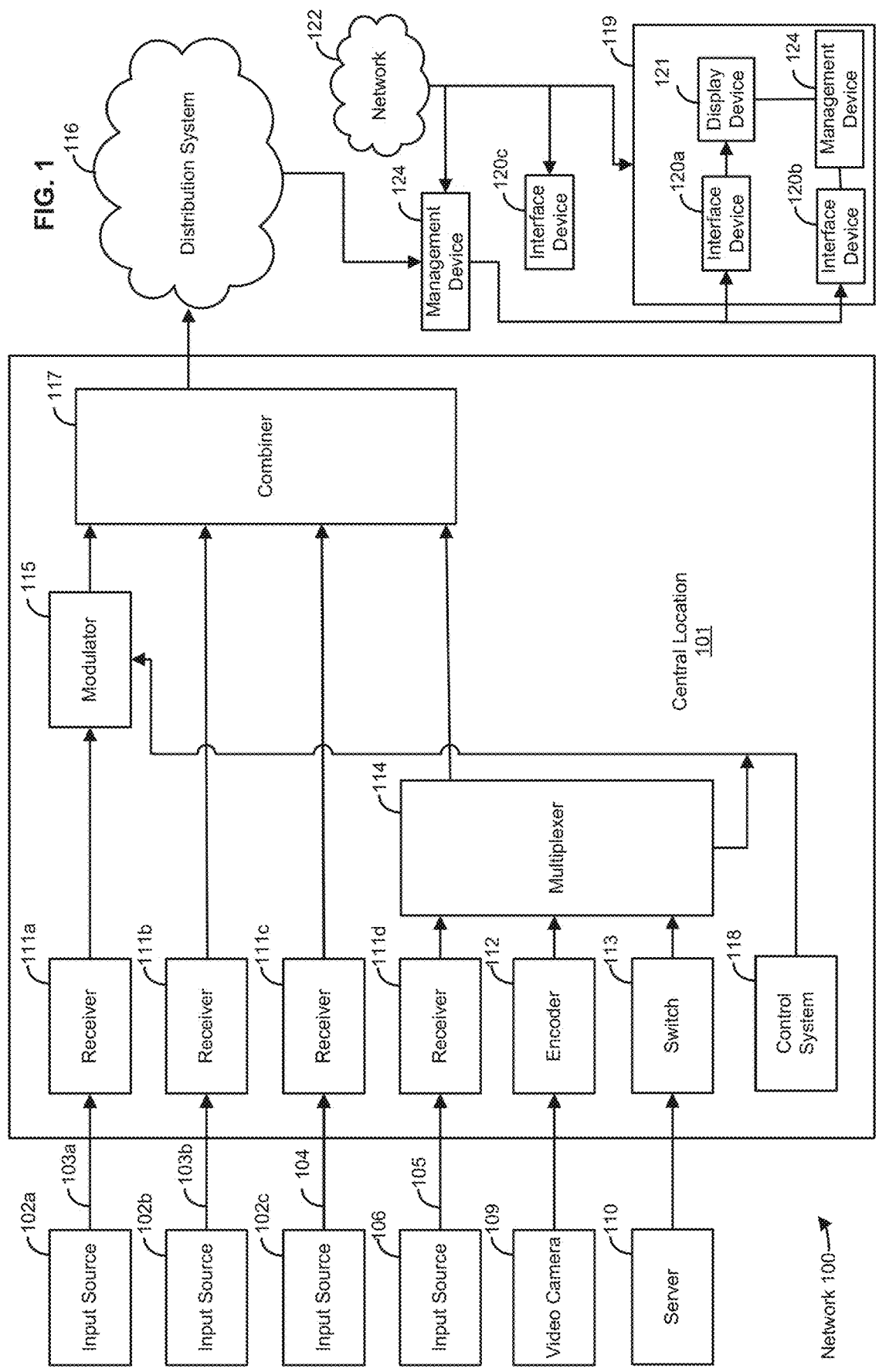
FIG. 1 is a block diagram of an exemplary network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and comprise the disclosed systems. These and other components are disclosed herein, and it is understood that when combinations, subsets, interactions, groups, etc. of these components are disclosed that while specific reference to each various individual and collective combination and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In an aspect, systems and methods are provided for automatically personalizing a user experience based upon a user location. The systems and methods provided can enable, for example, a device or system to recognize the presence of a specific user and then adjust various parameters that define a user experience. As another example, one or more interface devices can be automatically activated based upon a location of a user. Interface devices such as displays, user devices, smart phones, addressable speakers, communication terminals, and the like can be selectively activated, for example, based on a location of a user. In a certain aspect, any addressable device with audio output capability can be configured as part of an ad hoc audio system. As an example, the available addressable audio-capable devices can be automatically detected or manually specified. Once specified, the audio-capable devices can be managed to control the specific audio information that is transmitted to each audio-capable device. For example, balance levels and location-specific audio information (e.g., surround sound encoded audio information) can be automatically managed across all specific audio-capable devices to personalize the user experience.

FIG. 1 illustrates various aspects of an exemplary network environment in which the present methods and systems can operate. The present disclosure relates to methods and systems for automatically personalizing a user experience based on user location. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The network 100 can comprise a central location 101 (e.g., a control or processing facility in a fiber optic network, wireless network or satellite network, a hybrid-fiber coaxial (HFC) content distribution center, a processing center, headend, etc.), which can receive content (e.g., data, input programming, and the like) from multiple sources. The central location 101 can combine content from the various sources and can distribute the content to user (e.g., subscriber) locations (e.g., location 119) via distribution system 116.

In an aspect, the central location 101 can create content or receive content from a variety of sources 102a, 102b, 102c. The content can be transmitted from the source to the central location 101 via a variety of transmission paths, including wireless (e.g. satellite paths 103a, 103b) and terrestrial (e.g., fiber optic, coaxial path 104). The central location 101 can also receive content from a direct feed source 106 via a direct line 105. Content may also be created at the central location 101. Other input sources can comprise capture devices such as a video camera 109 or a server 110. The signals provided by the content sources can include, for example, a single content item or a multiplex that includes several content items.

The central location 101 can comprise one or a plurality of receivers 111a, 111b, 111c, 111d that are each associated with an input source. In an aspect, the central location 101 can create and/or receive applications, such as interactive application, for example. For example, MPEG encoders such as encoder 112, are included for encoding local content or a video camera 109 feed. A switch 113 can provide access to server 110, which can be, for example, a pay-per-view server, a data server, an internet router, a network system, a phone system, and the like. Some signals may require additional processing, such as signal multiplexing, prior to being modulated. Such multiplexing can be performed by multiplexer (mux) 114.

The central location 101 can comprise one or a plurality of modulators 115 for interfacing to the distribution system 116. The modulators can convert the received content into a modulated output signal suitable for transmission over the distribution system 116. The output signals from the modulators can be combined, using equipment such as a combiner 117, for input into the distribution system 116.

A control system 118 can permit a system operator to control and monitor the functions and performance of network 100. The control system 118 can interface, monitor, and/or control a variety of functions, including, but not limited to, the channel lineup for the television system, billing for each user, conditional access for content distributed to users, and the like. Control system 118 can provide input to the modulators for setting operating parameters, such as system specific MPEG table packet organization or conditional access information. The control system 118 can be located at central location 101 or at a remote location.

The distribution system 116 can distribute signals from the central location 101 to user locations, such as user location 119. In an aspect, the distribution system 116 can be in communication with an advertisement system for integrating and/or delivering advertisements to user locations. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116.

In an aspect, one or more interface devices 120a, 120b, 120c can comprise a decoder, a gateway, a communications terminal (CT), an audio terminal, or a mobile user device that can decode, if needed, the signals for display on a display device 121, such as a television, mobile device, a computer monitor, or the like. The display device 121 can be integrated with one or more of the interface devices 120a, 120b, 120c. Those skilled in the art will appreciate that the signal can be decoded in a variety of equipment, including a CT, a computer, a TV, a monitor, or a satellite dish. In an exemplary aspect, the methods and systems disclosed herein can be located within, or performed on, one or more interface devices 120a, 120b, 120c, display devices 121, central locations 101, DVR's, home theater PC's, and the like. The interface devices 120a, 120b, 120c can be located at the user location or disposed elsewhere.

In an aspect, user location 119 is not fixed. By way of example, a user can receive content from the distribution system 116 on a mobile device such as a laptop computer, PDA, smart phone, GPS, vehicle entertainment system, portable media player, and the like.

In an aspect, the interface devices 120a, 120b, 120c can receive signals from the distribution system 116 for rendering content such as video, audio, images, text, and the like via the interface devices 120a, 120b, 120c. As an example, rendering content can comprise providing audio and/or video, displaying images, facilitating an audio or visual feedback, tactile feedback, and the like. However, other content can be rendered via the interface devices 120a, 120b, 120c such as an interactive communication session (e.g., Voice over IP, telephone, video conference, etc.). In an aspect, the interface devices 120a, 120b, 120c can be a CT, a set-top box, a television, a computer, a smart phone, a laptop, a tablet, a multimedia playback device, a portable electronic device, and the like. As an example, the interface devices 120a, 120b, 120c can be an Internet protocol compatible device for receiving signals via a network 122 such as the Internet or some other communications network for providing content to the user. As a further example, other display devices and networks can be used. In an aspect, the interface devices 120a, 120b, 120c can be a widget or a virtual device for displaying content in a picture-in-picture environment such as on the display device 121, for example.

In an aspect, one or more of the interface devices 120a, 120b, 120c can be configured as a communication terminal for conducting two-way communications via a communications network such as a cellular network, telephone network, IP network, and the like. As an example, the interface devices 120a, 120b, 120c can be configured to transmit and/or receive communications such as voice, audio, video, text, and the like. As another example, the interface devices 120a, 120b, 120c can be configured to determine (e.g., calculate, detect, receive) a user location. As a further example, the interface devices 120a, 120b, 120c can be selectively connected to a network via a gateway or switch.

In an aspect, one or more of the interface devices 120a, 120b, 120c can be configured as an audio network for outputting audio to one or more users. As an example, the interface devices 120a, 120b, 120c can be configured to transmit an audible output to one or more users based on a location of the interface devices 120a, 120b, 120c relative to each other. As another example, the interface devices 120a, 120b, 120c can be configured to determine (e.g., calculate, detect, receive) a user location. Audio information transmitted to each of the interface devices 120a, 120b, 120c can be configured based upon one or more of a location of the user and a relative location of one or more of the interface devices 120a, 120b, 120c to each other. As an example, a surround sound audio experience can be provided to a user by specifically encoding audio information for each of the interface devices 120a, 120b, 120c. As the interface devices 120a, 120b, 120c are activated, deactivated, and/or moved, the audio information transmitted to each of the interface devices 120a, 120b, 120c can be automatically modified to maintain the surround sound audio experience presented to the user.

In an aspect, a management device 124 can be configured to detect or receive information relating to the availability of resources/devices such as the interface devices 120a, 120b, 120c. As an example, management device 124 can be configured to determine availability of one or more devices having audio output capability. The discovery of available devices can be based on Bluetooth discovery, WiFi discovery, or other wired/wireless technology. As an example, the Bluetooth protocol allows devices to advertise their capabilities. This can be performed using the Service Discovery Protocol (SDP). As another example, a device can be determined to be available if the device supports the Advanced Audio Distribution Protocol (A2DP). If the management device 124 detects interface devices 120a, 120b, 120c that support A2DP streaming, the management device 124 can determine that such interface devices 120a, 120b, 120c are available. As a further example, a client application executing on a client device (e.g., interface device 120a, 120b, 120c). Such a client device can register and communicate with the management device 124, indicating information relating to the availability of a speaker on the client device and the ability of the client device to receive streaming audio. As a further example, one of the interface devices 120a, 120b, 120c can be configured as the management device 124. In a manual mode, the user can interact with each of the interface devices 120a, 120b, 120c (either directly or via the management device 124) to set the desired audio configurations (e.g., channel settings, 5.1 configuration such as left-front, right-front, left-rear, right-rear, center, 7.1 surround sound configuration, etc.). In an automatic mode, the interface devices 120a, 120b, 120c can transmit and receive audio tones to calculate the relative distances from one another. The relative distance information can be used to generate a map of locations of the interface devices 120a, 120b, 120c. This map can then be used to provide standard surround audio mapping, object-based sound (e.g., Dolby Atmos), and the like. Once the interface devices 120a, 120b, 120c are mapped, the management device 124 can adjust balance levels across one or more of the interface devices 120a, 120b, 120c to provide a unique user experience. In another aspect, the management device 124 can communicate with a content source (e.g., central location 101) to manage content and the distribution of different audio information to the interface devices 120a, 120b, 120c. The management device 124 can be located at the premises 119 or external to the premises. The management device 124 can comprise hardware and/or software and can be integrated with one or more devices such as the interface devices 120a, 120b, 120c.

Figure 2A:
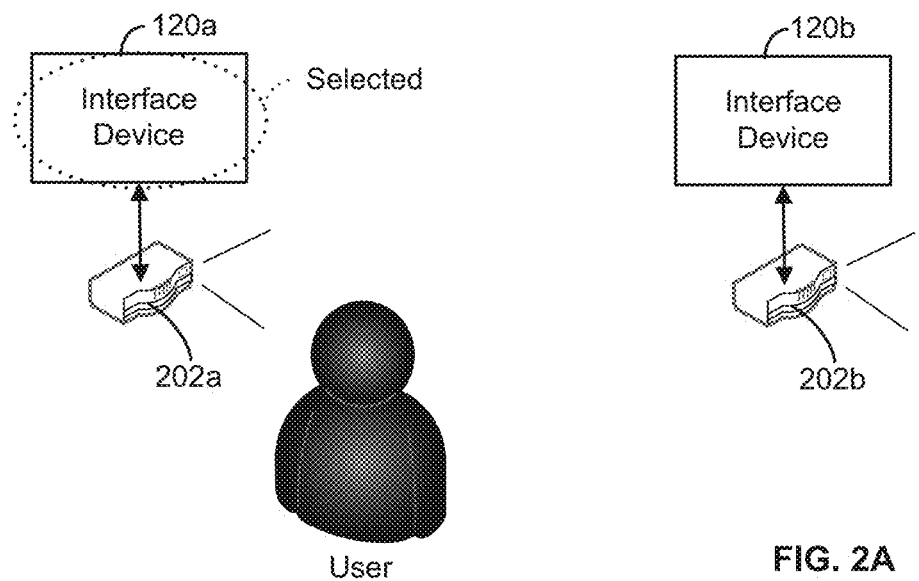
FIG. 2A is a block diagram of an exemplary system.
Figure 2B:
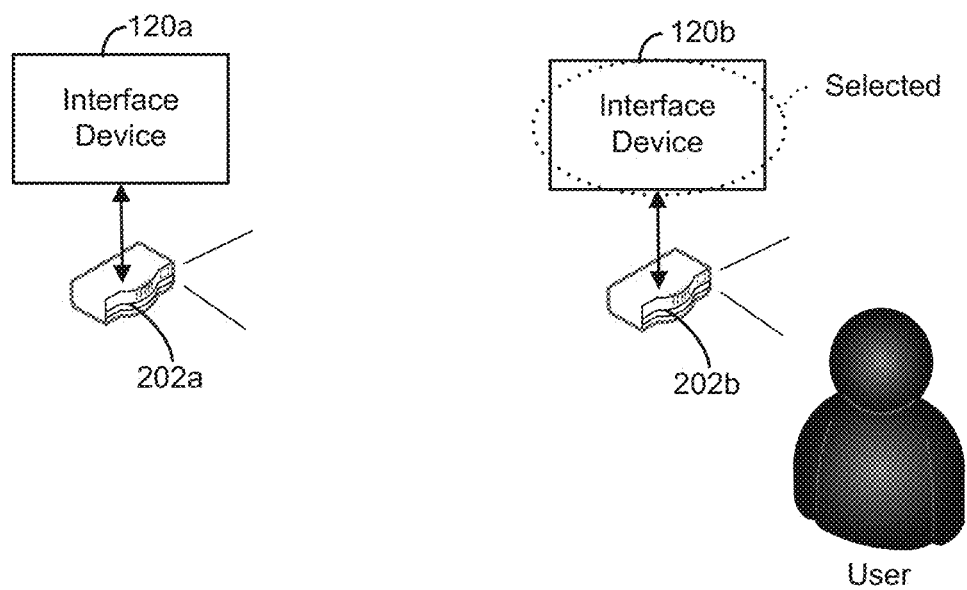
FIG. 2B is a block diagram of an exemplary system.
Figure 2C:
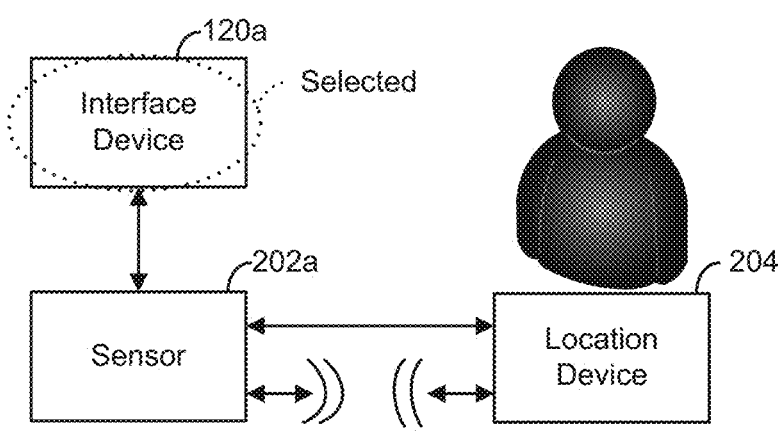
FIG. 2C is a block diagram of an exemplary system.

FIGS. 2A-2C illustrate various aspects of an exemplary network and system in which some of the disclosed methods and systems can operate. In an aspect, one or more sensors 202a, 202b (or a combination of multiple sensors) can be configured to determine (e.g., capture, retrieve, sense, measure, detect, extract, or the like) information relating to one or more users. As an example, the sensors 202a, 202b can be configured to determine the presence of one or more users or devices within a field of view of the sensors 202a, 202b. A field of view can be based on sensor input such as motion input, heat input, optical input, audio input, signal strength, quality of service (QOS), proximity, and the like. Field of view does not require that line of sight exist between a user and a sensor. Field of view can comprise an operational range of the one or more sensors 202a, 202b that is not limited to a direct line of sight. As a further example, the sensors 202a, 202b can be configured to determine a user state, such as behavior, biometrics, movement, physical and/or chemical characteristics, location, reaction, and/or other characteristics relating to one or more users. Other characteristics, identifiers, and features can be detected and/or monitored by the sensors 202a, 202b, such as gestures, sounds (e.g., voice, laughter), and/or environmental conditions (e.g., temperature, time of day, date, lighting, and the like).

In an aspect, the sensors 202a, 202b can comprise one or more of a camera, stereoscopic camera, wide-angle camera, visual sensor, thermal sensor, infrared sensor, biometric sensor, user tracking device, RF sensor, Bluetooth capable device, near field capable device, audio sensor, sound sensor, proximity sensor, haptic sensor, time sensor, and/or any other device for determining a user state or condition. In an aspect, the sensors 202a, 202b can be configured for one or more of facial recognition, gesture recognition, body heat analysis, behavioral analysis, eye tracking, head tracking, biometric, QoS, signal strength detection, analysis and/or other means of determining a user characteristic, a signal characteristic relating to a user, and/or a change in a characteristic. As an example, the sensors 202a, 202b can comprise software, hardware, algorithms, processor executable instructions, and the like to enable the sensors 202a, 202b to process any data captured or retrieved by the sensors 202a, 202b. As a further example, the sensors 202a, 202b can transmit data captured or retrieved thereby to a device or system in communication with the sensors 202a, 202b, such as a processor, server, one or more interface device 102a, 102b, or the like.

In an aspect, the sensors 202a, 202b can be in communication with one or more of the interface devices 120a, 120b. However, the interface devices 120a, 120b can receive data indirectly from the sensors 202a, 202b, such as via a processor, a server, an agent, a control device, or the like. As an example, the sensors 202a, 202b can be disposed within a pre-determined proximity of the interface devices 120a, 120b to determine information relating to one or more users within the pre-determined proximity of the interface devices 120a, 120b. Accordingly, the interface devices 120a, 120b can be configured to personalize a user experience being rendered thereby in response to data received from the sensors 202a, 202b and based upon determined characteristics of the one or more users within the pre-determined proximity of the interface devices 120a, 120b. However, the sensors 202a, 202b can be disposed in any location relative to the interface devices 120a, 120b.

As shown in FIG. 2A, when a user is within the field, e.g., field of view of the sensor 202a, data relating to the presence and/or user state of the user can be communicated to the associated interface devices 120a. Accordingly, the interface device 120a can be automatically selected (e.g., activated, enabled, energized, etc.). As an example, content can be presented via the selected interface devices 102a. As the user moves out of the field of the sensor 202a and into the field of the sensor 202b, the interface device 120b associated with sensor 202b can be automatically selected, as illustrated in FIG. 2B. In an aspect, when a user moves out of a field of one or more of the sensors 202a, 202b, the associated interface device 120a, 120b, can be deselected.

In an aspect, a user can be detected by a plurality of sensors 202a, 202b concurrently. As an example, information received or accessed by two or more of the plurality of sensors 202a, 202b can be compared in order to determine the interface device to select. As another example, two or more sensors 202a, 202b can receive an audio signal from a user or device co-located (e.g., in proximity to the user or held/carried by the user) with the user. As such, the QoS (including network characteristics such as bandwidth) or audio level of the received audio at each of the two or more sensors 202a, 202b can be compared and the sensor 202a, 202b receiving the highest QoS or highest audio level can be selected. Accordingly, the interface device associated with the selected one of the sensors 202a, 202b can be automatically activated.

In an aspect, a location device 204 can be associated with a particular user, as illustrated in FIG. 2C. The location device 204 can comprise a transmitter and/or receiver. As an example, the location device 204 can transmit a signal that can be detected by one or more sensors, such as sensor 202*a*. When the sensor 202*a* detects the signal transmitted by the location device 204, the interface device 120*a* associated with the sensor 202*a* detecting the signal can be automatically selected.

As another example, one or more interface devices can be automatically activated based upon a location of a user. In an aspect, interface devices such as displays, user devices, smart phones, addressable speakers, communication terminals, and the like can be selectively activated, for example, based on a location of a user. In a certain aspect, any addressable device with audio output capability can be configured as part of an ad hoc audio system. As an example, the available addressable audio-capable devices can be automatically detected or manually specified. Once specified, the audio-capable devices can be managed to control the specific audio information that is transmitted to each audio-capable device. For example, balance levels and location-specific audio information (e.g., surround sound encoded audio information) can be automatically managed across all specific audio-capable devices to provide the user experience.

Figure 2D:
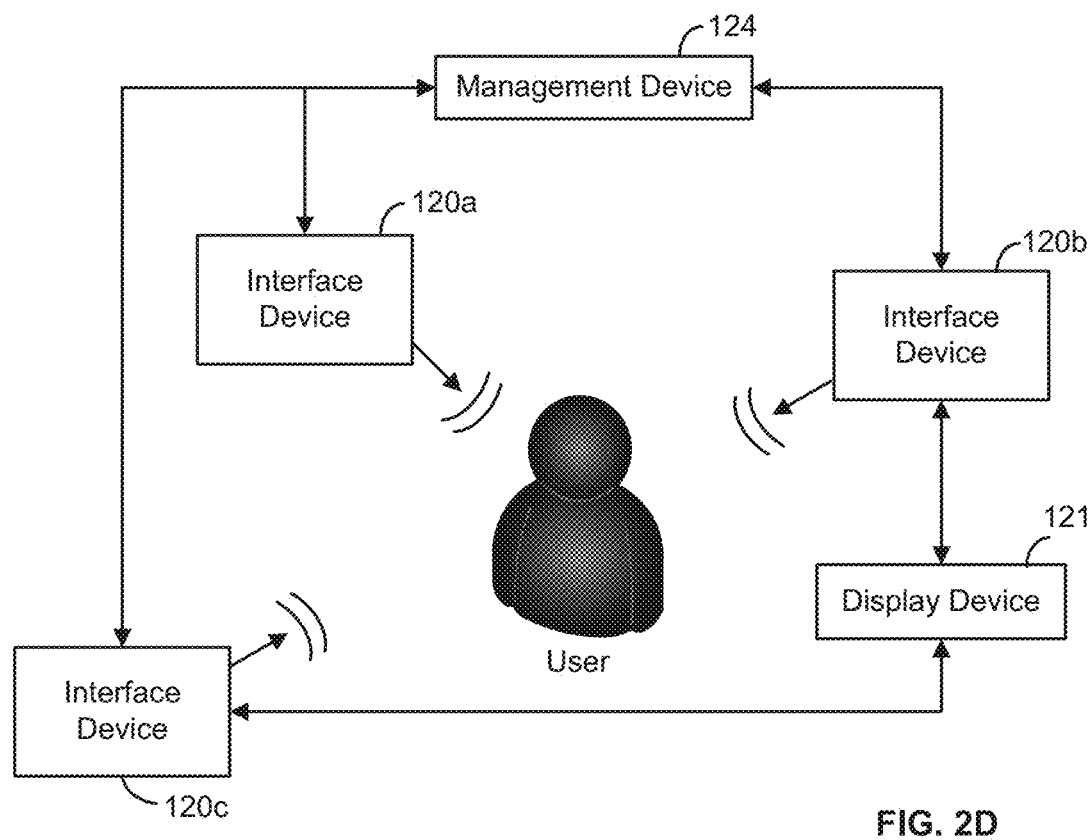
FIG. 2D is a block diagram of an exemplary system.
Figure 2E:
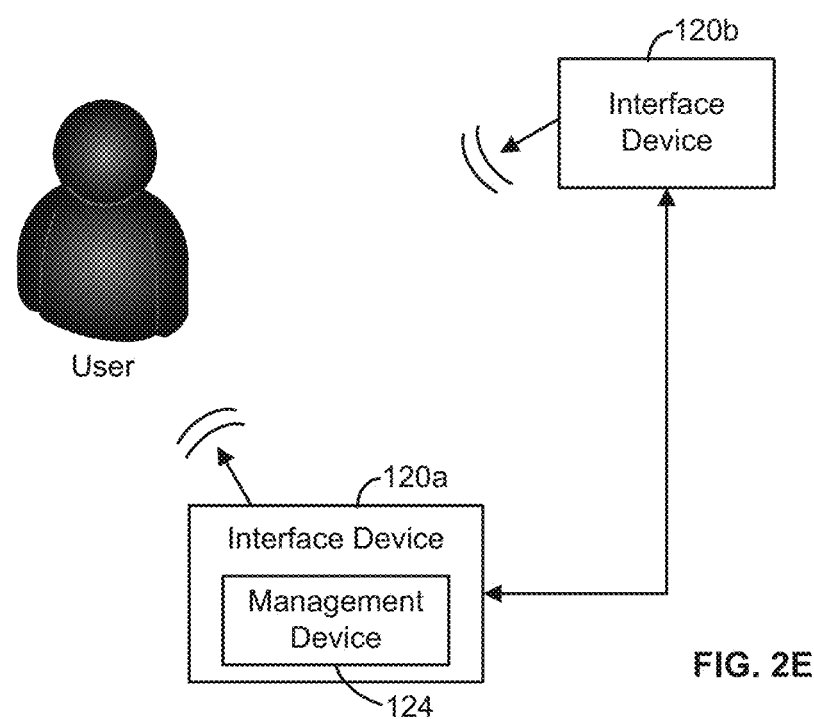
FIG. 2E is a block diagram of an exemplary system.

FIGS. 2D-2E illustrate various aspects of an exemplary network and system in which some of the disclosed methods and systems can operate. In an aspect, one or more of the interface devices 120*a*, 120*b*, 120*c* can be configured as an audio network for outputting audio to one or more users. As an example, the interface devices 120*a*, 120*b*, 120*c* can be configured to transmit an audible output to one or more users based on a location of the interface devices 120*a*, 120*b*, 120*c* relative to each other. As another example, the interface devices 120*a*, 120*b*, 120*c* can be configured to determine (e.g., calculate, detect, receive) a user location. Audio information transmitted to each of the interface devices 120*a*, 120*b*, 120*c* can be configured based upon one or more of a location of the user and a relative location of one or more of the interface devices 120*a*, 120*b*, 120*c* to each other. As an example, a surround sound audio experience can be provided to a user by specifically encoding audio information for each of the interface devices 120*a*, 120*b*, 120*c*. As the interface devices 120*a*, 120*b*, 120*c* are activated, deactivated, and/or moved, the audio information transmitted to each of the interface devices 120*a*, 120*b*, 120*c* can be automatically modified to maintain the surround sound audio experience presented to the user.

In an aspect, the management device 124 can be configured to detect or receive information relating to the availability of resources/devices such as the interface devices 120*a*, 120*b*, 120*c*. As an example, management device 124 can be configured to determine availability of one or more devices having audio output capability. As a further example, one of the interface devices 120*a*, 120*b*, 120*c* can be configured as the management device 124 (FIG. 2E). In a manual mode, the user can interact with each of the interface devices 120*a*, 120*b*, 120*c* (either directly or via the management device 124) to set the desired audio configurations (e.g., channel settings, 5.1 configuration such as left-front, right-front, left-rear, right-rear, center, 7.1 surround sound configuration, etc.). In an automatic mode, the interface devices 120*a*, 120*b*, 120*c* can transmit and receive audio tones to calculate the relative distances from one another. The relative distance information can be used to generate a map of locations of the interface devices 120*a*, 120*b*, 120*c*. This map can then be used to provide standard surround audio mapping, object-based sound (e.g., Dolby Atmos), and the like. Once the interface devices 120*a*, 120*b*, 120*c* are mapped, the management device 124 can adjust balance levels across one or more of the interface devices 120*a*, 120*b*, 120*c* to provide a unique user experience. In another aspect, the management device 124 can communicate with a content source (e.g., central location 101) to manage content and the distribution of different audio information to the interface devices 120*a*, 120*b*, 120*c*. The management device 124 can be located at the premises 119 or external the premises. The management device 124 can comprise hardware and/or software and can be integrated with one or more devices such as the interface devices 120*a*, 120*b*, 120*c*.

Figure 3:
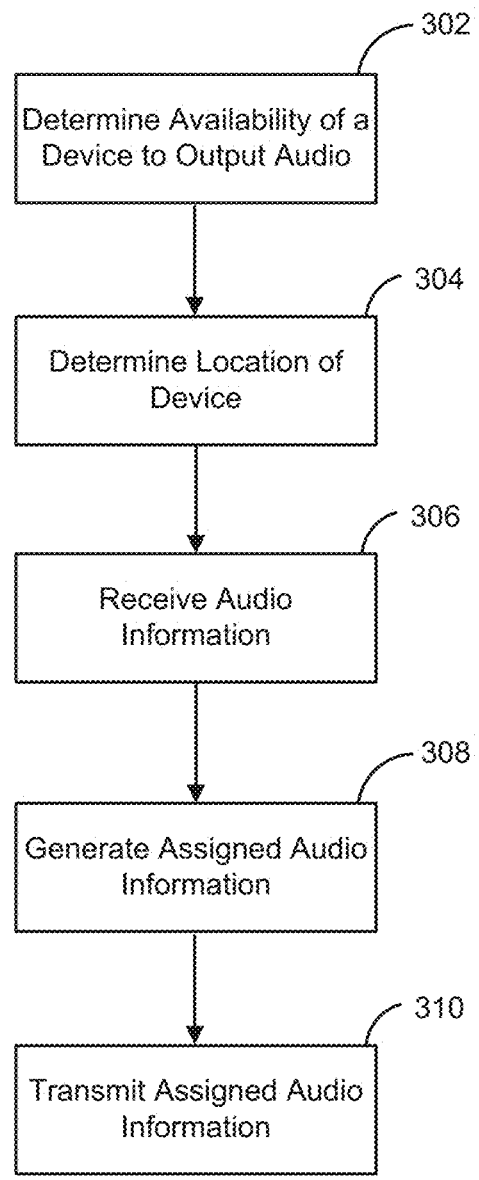
FIG. 3 is a flow chart of an exemplary method.

FIG. 3 illustrates an exemplary method for personalizing and controlling a user experience. At step 302, availability of one or more devices to output audio can be determined. The determination of availability can comprise receiving a user-provided input. The determination of availability can comprise polling or discovering one or more devices. As an example, a management device can be configured to determine availability of one or more devices having audio output capability. The discovery of available devices can be based on Bluetooth discovery, WiFi discovery, or other wired/wireless technology. As an example, the Bluetooth protocol allows devices to advertise their capabilities. This can be performed using the Service Discovery Protocol (SDP). As another example, a device can be determined to be available if the device supports the Advanced Audio Distribution Protocol (A2DP). If the management device detects interface devices that support A2DP streaming, the management device can determine that such interface devices are available. As a further example, determining available devices can comprise a client application executing on a client device (e.g., interface device 120*a*, 120*b*, 120*c*). Such a client device can register and communicate with the management device, indicating information relating to the availability of a speaker on the client device and the ability of the client device to receive streaming audio.

At step 304, a location of one or more available devices can be determined. In an aspect, determining a location of the available device can comprise determining a proximity of the device to a user. In another aspect, determining a location of the available device can comprise determining a proximity of the available device to a second device. As an example, the second device can comprise a display for presenting images. In a further aspect, determining a location of the available device can comprise determining a location of one or more users. In an aspect, sensors can receive or access information (e.g., user data) relating to one or more users or devices within the field of view of the sensor. As an example, the location of one or more users or devices can be determined by relative proximity to a sensor. As such, when a sensor detects a presence of a user or device, it can be assumed that the user is located within the proximity of the detecting sensor. As a further example, the user data can be processed to determine an identity of one or more of the users or devices within the field of view of the sensor, such as by facial recognition, gesture recognition, body heat analysis, behavioral analysis, eye tracking, head tracking, biometric analysis and/or other means of determining a user characteristic and/or a change in a user characteristic. Other techniques can be used to identify a user or device, including direct query and/or user input.

At step 306, audio information can be received. In an aspect, the audio information can comprise encoded information relating to an audio output. In an aspect, audio information can comprise an audio track and a corresponding relative position. As an example, audio information can comprise a first audio track with an indication of a right position, a second audio track with an indication of a left position, a third audio track with an indication of a forward position, a fourth audio track with an indication of a backward position, etc. In an aspect, the audio information can be received from an upstream source such as a content provider.

At step 308, at least a portion of the audio information can be configured to generate assigned audio information. In an aspect, the audio information can be configured based on the determined location of the available device. In another aspect, configuring at least a portion of the audio information can comprise decoding the at least a portion of the audio information. As an example, in a standard 2.1, 5.1, or 7.1 audio configurations, individual channels are defined when the content is mastered. However, in an ad hoc configuration where the number and types of speakers are unknown, each output device (e.g., audio output element, speaker) can be treated as an "object." As such, the determination of which device (object) is to play a particular sound can be mapped at execution time based on availability of a particular device and/or capabilities of that device. As availability and/or capability changes, the mapping can be modified in real-time at execution. As a further example, each available device can be mapped to a particular conventional channel. That is, if the audio source is 5.1 surround, individual devices can be tagged as "center", "left front", "right front", "left rear", "right rear", and/or "subwoofer," respectively. If more devices than channels are available, options can be presented to the user, such as, using multiple speakers in combination to output a single channel. In a further aspect, configuring at least a portion of the audio information can comprise encoding the at least a portion of the audio information. As an example, portions of the source audio information can be encoded at execution to be specifically delivered to one or more available devices in real-time. As availability and/or capability changes, the encoding can be modified in real-time at execution.

At step 310, the assigned audio information can be transmitted to the available device. In an aspect, a user experience can be provided via the available device (e.g., via the interface device itself or a device in communication with the interface device) and based upon the audio information. In an aspect, the user experience can comprise visual and/or audible content for user consumption. As an example, the user experience can comprise environmental characteristics such as lighting, security settings, temperature, tactile feedback, and/or other sensory feedbacks. As a further example, the user experience can comprise a communication session, such as a communication over a telephone network, a cellular network, the Internet, or the like.

In an aspect, an audio output (e.g., based on the received audio information) can be modified based on a location of a user. As an example, when the user moves from the family room into the kitchen, the audio feedback can be routed to interface devices (e.g., speakers and/or displays, which may be part of the interface device or in communication with the interface device) located in the kitchen. Likewise, when the user returns from the kitchen and enters the family room, the audio output can be returned to an interface device in the family room. As another example, audio levels of an audio output can be modified based on a parameter such as a user location.

In an aspect, audio output can be directed to a specific location of a user within a given room. For example, when a user moves from one end of the room to the opposite end of the room, the audio output can be configured to follow the user across the room by varying the particular level of a plurality of interface devices.

In an aspect, an audio identifier can be assigned to the available device. In an aspect, configuring at least a portion of the audio information is based at least in part on the assigned audio identifier. As an example, audio identifiers can reflect the traditional speaker definitions of 2.1, 5.1, or 7.1 layouts, and the like. As another example, in a two-speaker layout, audio identifiers can relate to a left and a right channel designation. With five satellite speakers, audio identifiers can relate to left front, right front, center, left rear, and right rear designations. With seven speakers, rear channels of the five satellite speaker configuration can be split into a left side/left rear and right side/right rear configuration. As a further example, when an object-based audio encoding is used, audio identifiers can relate to absolute or relative position of the speaker. A position of one or more speakers can be relative to center speaker, device, or a designated point. Audio identifiers can also relate to capabilities of the speaker (e.g., output device) that can be utilized by the audio processor to produce the effects of sound localization and movement, for example.

Figure 4:
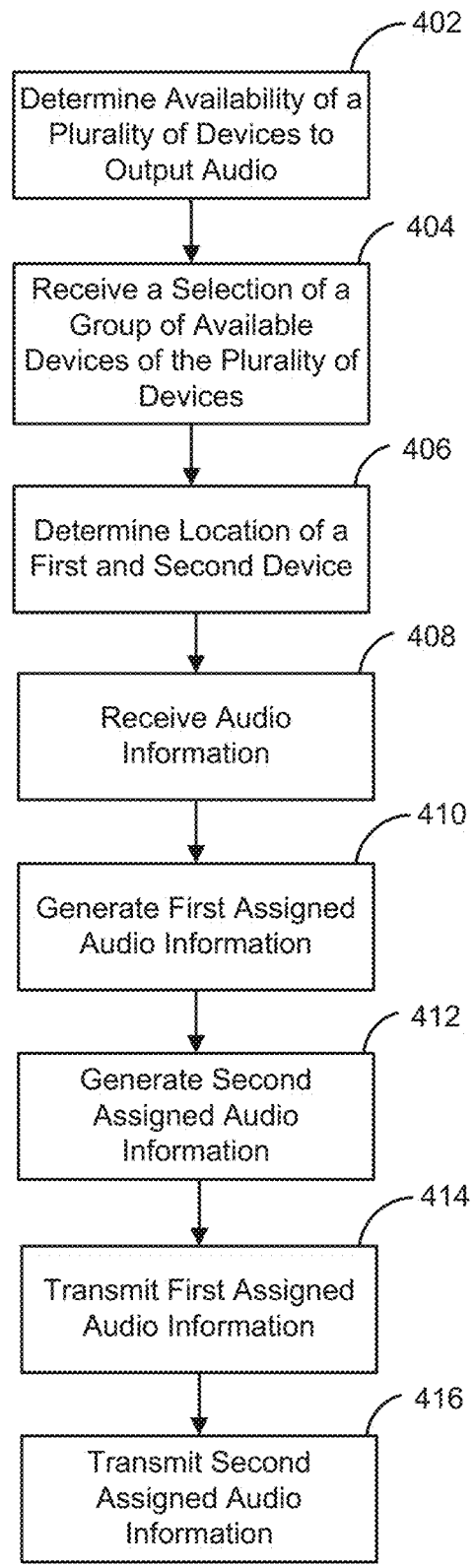
FIG. 4 is a flow chart of an exemplary method.

FIG. 4 illustrates an exemplary method for personalizing and controlling a user experience. In step 402, availability of a plurality of devices to output audio can be determined. The determination of availability can comprise receiving a user-provided input. The determination of availability can comprise polling or discovering one or more devices. The determination of availability can comprise receiving a user-provided input. The determination of availability can comprise polling or discovering one or more devices. As an example, a management device can be configured to determine availability of one or more devices having audio output capability. The discovery of available devices can be based on Bluetooth discovery, WiFi discovery, or other wired/wireless technology. As an example, the Bluetooth protocol allows devices to advertise their capabilities. This can be performed using the Service Discovery Protocol (SDP). As another example, a device can be determined to be available if the device supports the Advanced Audio Distribution Protocol (A2DP). If the management device detects interface devices that support A2DP streaming, the management device can determine that such interface devices are available. As a further example, determining available devices can comprise a client application executing on a client device (e.g., interface device 120*a*, 120*b*, 120*c*). Such a client device can register and communicate with the management device, indicating information relating to the availability of a speaker on the client device and the ability of the client device to receive streaming audio.

In an aspect, determining an availability of a plurality of devices to output audio can comprise an automated determination of the plurality of available devices can be received. In an aspect, the automated selection can be made by the management device. In an aspect, the selection can be made by user-provided input. In an aspect, the plurality of available devices can be determined based on one or more of the following: quality of the audio output of the plurality of available devices, volume capability of the audio output of the plurality of available devices, location of the audio output of the plurality of available devices, and any other attribute of the audio output of the plurality of available devices.

In step 404, a first location of a first device and a second location of a second device of the plurality of available devices can be determined. In an aspect, determining a location of the available device can comprise determining a proximity of the device to a user. In another aspect, determining a location of the available device can comprise determining a proximity of the available device to a second device. As an example, the second device can comprise a display for presenting images. In a further aspect, determining a location of the available device can comprise determining a location of one or more users. In an aspect, sensors can receive or access information (e.g., user data) relating to one or more users or devices within the field of view of the sensor. As an example, the location of one or more users or devices can be determined by relative proximity to a sensor. As such, when a sensor detects a presence of a user or device, it can be assumed that the user is located within the proximity of the detecting sensor. As a further example, the user data can be processed to determine an identity of one or more of the users or devices within the field of view of the sensor, such as by facial recognition, gesture recognition, body heat analysis, behavioral analysis, eye tracking, head tracking, biometric analysis and/or other means of determining a user characteristic and/or a change in a user characteristic. Other techniques can be used to identify a user or device, including direct query and/or user input.

In step 406, audio information can be received. In an aspect, the audio information can comprise encoded information relating to an audio output. As an example, the audio information can be received from an upstream source such as a content provider. In an aspect, audio information can comprise any audio information such as, for example, music, an audio track for a movie or show, an audio broadcast accompanying a sporting event, a conversation, such as a telephone conversation, metadata accompanying any of the foregoing, and/or any combination of the foregoing.

In step 408, first assigned audio information can be generated. In an aspect, the first assigned audio information can be based on the received audio information and the first location. As an example, generating first assigned audio information can comprise decoding at least a portion of the received audio information. As another example, generating first assigned audio information can comprise re-encoding the portion of the received audio information. As a further example, the first assigned audio information can be generated by encoding a portion of audio information for the first device, based upon a relative position of the first device. In an aspect, generating the first assigned audio information can be based on a determined proximity of a user to the first device. In an aspect, generating the first assigned audio information can be based on a determined proximity of the first device to a second device.

In step 410, second assigned audio information can be generated. In an aspect, the second assigned audio information can be generated based on the received audio information and the second location. As an example, generating second assigned audio information can comprise decoding at least a portion of the received audio information. As another example, generating second assigned audio information can comprise re-encoding the portion of the received audio information. As a further example, the second assigned audio information can be generated by encoding a portion of audio information for the second device, based upon a relative position of the second device. In an aspect, generating the second assigned audio information can be based on a determined proximity of a user to the second device. In an aspect, generating the second assigned audio information can be based on a determined proximity of the second device to a first device.

In step 412, the first assigned audio information can be transmitted to the first device of the plurality of available devices. In an aspect, a user experience can be personalized via the first device of the plurality of available devices (e.g., via the interface device itself or a device in communication with the interface device) and based upon the audio information. In an aspect, the user experience can comprise visual and/or audio content for user consumption. As an example, the user experience can comprise environmental characteristics, such as lighting, security settings, temperature, tactile feedback, and/or other sensory feedbacks. As a further example, the user experience can comprise a communication session, such as a communication over a telephone network, a cellular network, the Internet, or the like.

In step 414, the second assigned audio information can be transmitted to the second device of the plurality of available devices. In an aspect, a user experience can be personalized via the second device of the plurality of available devices (e.g., via the interface device itself or a device in communication with the interface device) and based upon the audio information. In an aspect, the user experience can comprise visual and/or audio content for user consumption. As an example, the user experience can comprise environmental characteristics, such as lighting, security settings, temperature, tactile feedback, and/or other sensory feedbacks. As a further example, the user experience can comprise a communication session, such as a communication over a telephone network, a cellular network, the Internet, or the like.

Figure 5:
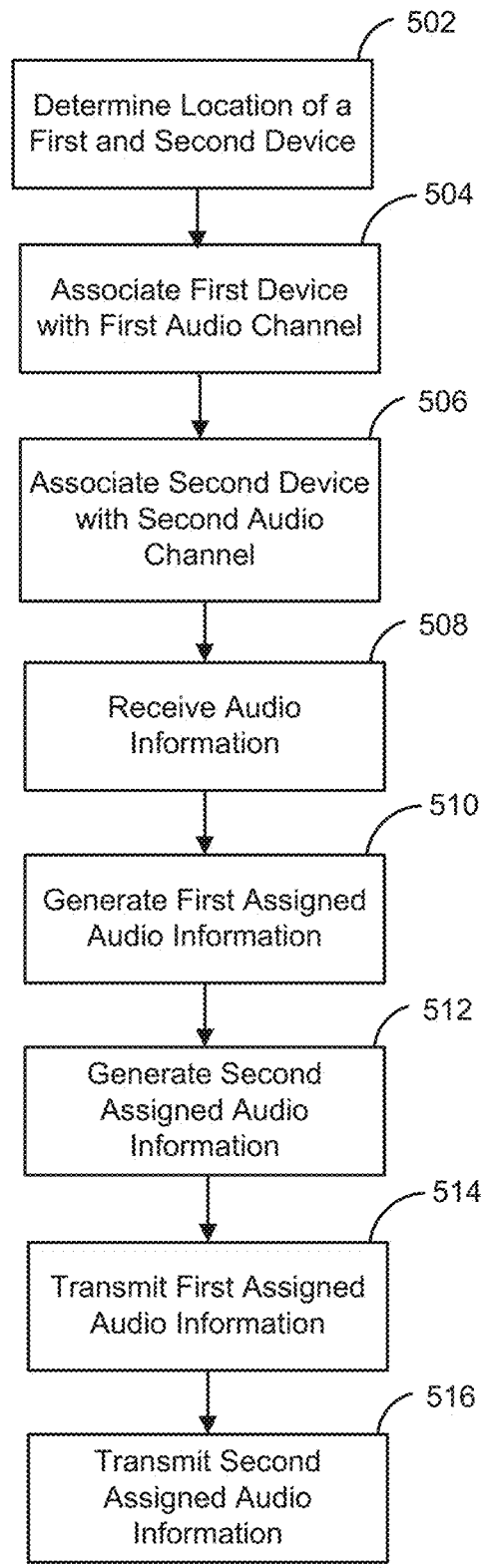
FIG. 5 is a flow chart of an exemplary method.

FIG. 5 illustrates an exemplary method for personalizing and controlling a user experience. In step 502, a first location of a first device and a second location of a second device can be determined. In an aspect, determining the location of one or more of the first device and the second device can comprise determining a proximity of the respective device to a user. In another aspect, determining a location of the available device can comprise determining a proximity of one or more of the first device and the second device to each other. In a further aspect, determining a location of one or more of the first device and the second device can comprise determining a location of one or more users. In an aspect, sensors can receive or access information (e.g., user data) relating to one or more users or devices within the field of view of the sensor. As an example, the location of one or more users or devices can be determined by relative proximity to a sensor. As such, when a sensor detects a presence of a user or device, it can be assumed that the user is located within the proximity of the detecting sensor. As a further example, the user data can be processed to determine an identity of one or more of the users or devices within the field of view of the sensor, such as by facial recognition, gesture recognition, body heat analysis, behavioral analysis, eye tracking, head tracking, biometric analysis and/or other means of determining a user characteristic and/or a change in a user characteristic. Other techniques can be used to identify a user or device, including direct query and/or user input.

In step 504, the first device can be associated with a first audio channel based on the determined location of the first device. In an aspect, the first audio channel can have an audio characteristic associated therewith. As an example, an audio characteristic can relate to a desired audible output for a particular speaker. Audio characteristics can relate to a portion of the overall available audio, such as surround sound channeling and the like. Audio characteristics can relate to treble, bass, volume, equalization of frequencies and bands, audio filters, reverb, sound effects, and/or other audio characteristics.

In step 506, the second device can be associated with a second audio channel based on the determined location of the second device. In an aspect, the second audio channel can have an audio characteristic associated therewith. As an example, an audio characteristic can relate to a desired audible output for a particular speaker. Audio characteristics can relate to a portion of the overall available audio, such as surround sound channeling and the like. Audio characteristics can relate to treble, bass, volume, equalization of frequencies and bands, audio filters, reverb, sound effects, and/or other audio characteristics. As another example, the second audio channel can be associated with the same or different audio characteristics than the first audio channel.

In step 508, audio information can be received. In an aspect, the audio information can comprise encoded information relating to an audio output. As an example, the audio information can be received from an upstream source such as a content provider. In an aspect, audio information can comprise any audio information such as, for example, music, an audio track for a movie or show, an audio broadcast accompanying a sporting event, a conversation, such as a telephone conversation, metadata accompanying any of the foregoing, and/or any combination of the foregoing.

In step 510, first assigned audio information can be generated. In an aspect, the first assigned audio information can be based on the received audio information and an audio characteristic associated with the first audio channel. As an example, generating first assigned audio information can comprise decoding at least a portion of the received audio information. As another example, generating first assigned audio information can comprise re-encoding the portion of the received audio information. As a further example, the first assigned audio information can be generated by encoding a portion of audio information for a particular device, based upon a relative position of the device. In an aspect, generating the first assigned audio information can be based on a determined proximity of a user to the first device. In an aspect, generating the first assigned audio information can be based on a determined proximity of the first device to a second device.

In step 512, second assigned audio information can be generated. In an aspect, the second assigned audio information can be based on the received audio information and an audio characteristic associated with the second audio channel. As an example, generating second assigned audio information can comprise decoding at least a portion of the received audio information. As another example, generating second assigned audio information can comprise re-encoding the portion of the received audio information. As a further example, the second assigned audio information can be generated by encoding a portion of audio information for a particular device, based upon a relative position of the device. In an aspect, generating the second assigned audio information can be based on a determined proximity of a user to the second device. In an aspect, generating the second assigned audio information can be based on a determined proximity of the second device to a first device.

In step 514, the first assigned audio information can be transmitted to the first device. In an aspect, a user experience can be personalized via the first device of the plurality of available devices (e.g., via the interface device or a device in communication with the interface device) and based upon the audio information. In an aspect, the user experience can comprise a visual and/or audible content for user consumption. As an example, the user experience can comprise environmental characteristics, such as lighting, security settings, temperature, tactile feedback, and/or other sensory feedbacks. As a further example, the user experience can comprise a communication session, such as a communication over a telephone network, a cellular network, the Internet, or the like.

In step 516, the second assigned audio information can be transmitted to the second device. In an aspect, a user experience can be personalized via the second device of the plurality of available devices (e.g., via the interface device itself or a device in communication with the interface device) and based upon the audio information. In an aspect, the user experience can comprise a visual and/or audible content for user consumption. As an example, the user experience can comprise environmental characteristics, such as lighting, security settings, temperature, tactile feedback, and/or other sensory feedbacks. As a further example, the user experience can comprise a communication session, such as a communication over a telephone network, a cellular network, the Internet, or the like.

Figure 6:
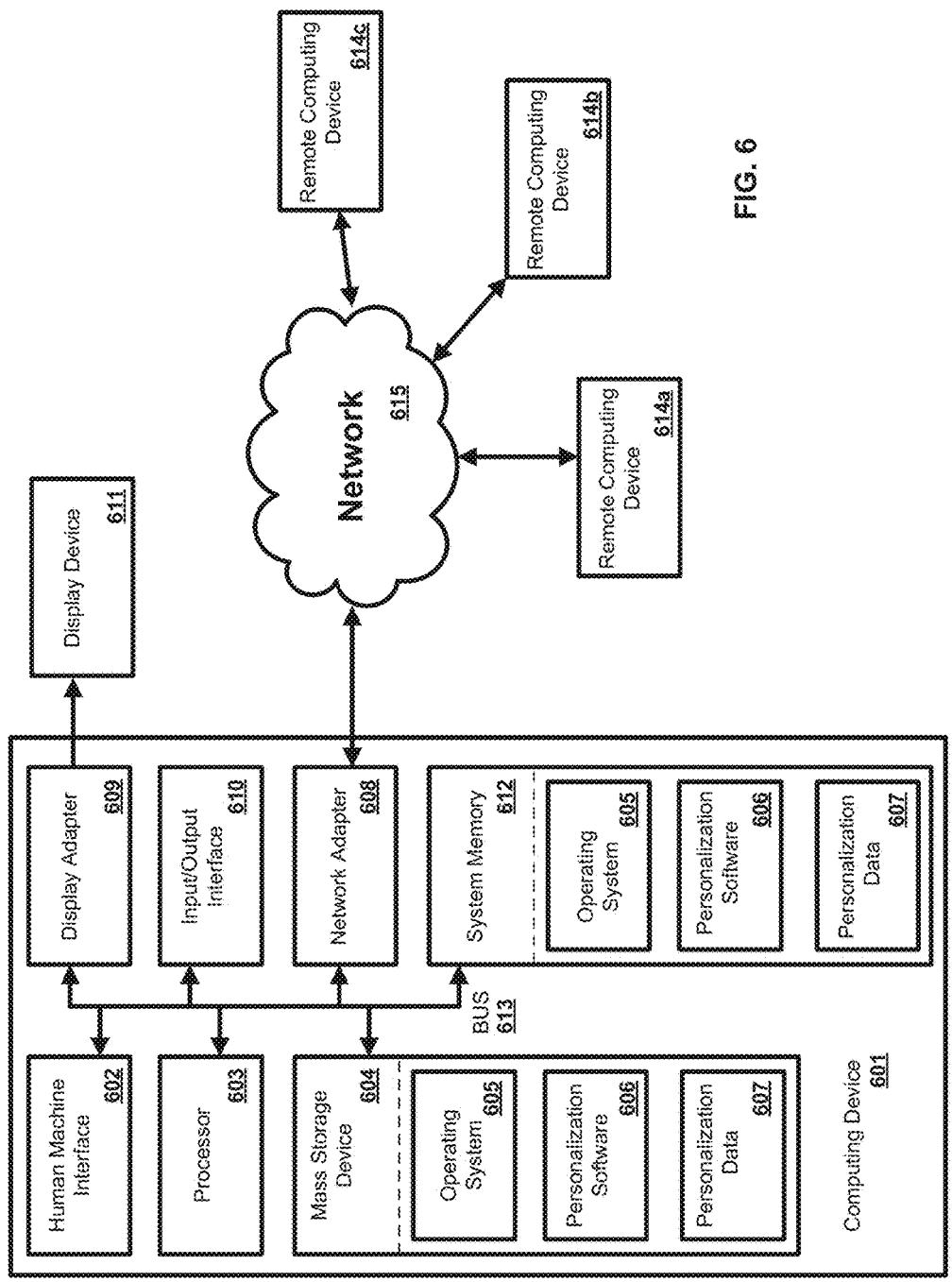
FIG. 6 is a block diagram of an exemplary computing device.

In an exemplary aspect, the methods and systems can be implemented on a computing device, such as computing device 601 as illustrated in FIG. 6 and described below. By way of example, server 110 of FIG. 1 can be a computer as illustrated in FIG. 6. Similarly, the methods and systems disclosed can utilize one or more computers to perform one or more functions in one or more locations. FIG. 6 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 601. The components of the computing device 601 can comprise, but are not limited to, one or more processors or processing units 603, a system memory 612, and a system bus 613 that couples various system components including the processor 603 to the system memory 612. In the case of multiple processing units 603, the system can utilize parallel computing.

The system bus 613 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description can also be implemented over a wired or wireless network connection and each of the subsystems, including the processor 603, a mass storage device 604, an operating system 605, personalization software 606, user data and/or personalization data 607, a network adapter 608, system memory 612, an Input/Output Interface 610, a display adapter 609, a display device 611, and a human machine interface 602, can be contained within one or more remote computing devices 614a,b,c at physically separate locations, connected through buses of this form, in effect implementing a fully distributed system.

The computing device 601 typically comprises a variety of computer readable media. Exemplary readable media can be any available media that is accessible by the computing device 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as personalization data 607 and/or program modules such as operating system 605 and personalization software 606 that are immediately accessible to and/or are presently operated on by the processing unit 603.

In another aspect, the computing device 601 can also comprise other removable/non-removable, volatile/non-volatile computer storage media. By way of example, FIG. 6 illustrates a mass storage device 604 which can provide non-volatile storage of computer code, computer readable instructions, data structures, program modules, and other data for the computing device 601. For example and not meant to be limiting, a mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, an operating system 605 and personalization software 606. Each of the operating system 605 and personalization software 606 (or some combination thereof) can comprise elements of the programming and the personalization software 606. Personalization data 607 can also be stored on the mass storage device 604. Personalization data 607 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 601 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 603 via a human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another aspect, a display device 611 can also be connected to the system bus 613 via an interface, such as a display adapter 609. It is contemplated that the computing device 601 can have more than one display adapter 609 and the computing device 601 can have more than one display device 611. For example, a display device can be a monitor, an LCD (Liquid Crystal Display), or a projector. In addition to the display device 611, other output peripheral devices can comprise components such as speakers (not shown) and a printer (not shown) which can be connected to the computing device 601 via Input/Output Interface 610. Any step and/or result of the methods can be output in any form to an output device. Such output can be any form of visual representation, including, but not limited to, textual, graphical, animation, audio, tactile, and the like. The display 611 and computing device 601 can be part of one device, or separate devices.

The computing device 601 can operate in a networked environment using logical connections to one or more remote computing devices 614a,b,c. By way of example, a remote computing device can be a personal computer, portable computer, smart phone, a server, a router, a network computer, a peer device or other common network node, and so on. Logical connections between the computing device 601 and a remote computing device 614a,b,c can be made via a network 615, such as a local area network (LAN) and/or a general wide area network (WAN). Such network connections can be through a network adapter 608. A network adapter 608 can be implemented in both wired and wireless environments. Such networking environments are conventional and commonplace in dwellings, offices, enterprise-wide computer networks, intranets, and the Internet.

For purposes of illustration, application programs and other executable program components such as the operating system 605 are illustrated herein as discrete blocks, although it is recognized that such programs and components reside at various times in different storage components of the computing device 601, and are executed by the data processor(s) of the computer. An implementation of personalization software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   receiving, from a first sensor, first user information;
   determining, based on the first user information, a content item;
   causing a first interface associated with the first sensor to initiate playback of the content item;
   receiving, from a second sensor, second user information;
   causing, based on the second user information, the first interface to cease playback of the content item; and
   causing a second interface associated with the second sensor to resume playback of the content item.

2. The method of claim 1, further comprising:
   determining, by the first sensor, the first user information based on one or more of facial recognition or voice analysis; and
   determining, by the second sensor, the second user information based on one or more of facial recognition or voice analysis.

3. The method of claim 1, wherein the content item is associated with one or more of video content, audio content, an image, or text.

4. The method of claim 1, wherein the first interface and the second interface are each configured to output the content item.

5. The method of claim 1, wherein the first interface is configured to output, based on the content item, a first audio signal, and the second interface is configured to output, based on the content item, a second audio signal.

6. The method of claim 5, wherein the first interface outputs the first audio signal based on a first set of audio characteristics and the second interface outputs the second audio signal based on a second set of audio characteristics.

7. The method of claim 6, wherein the first set of audio characteristics comprise at least one of, treble, bass, volume, equalization of frequencies and bands, or audio filters.

8. The method of claim 6, wherein the second set of audio characteristics comprise at least one of, treble, bass, volume, equalization of frequencies and bands, or audio filters.

9. A method comprising:
   determining, by a sensor, user information;
   sending, based on the user information, an indication that a user is present;
   receiving, based on sending the indication that the user is present, information;
   initiating, based on the information, playback of a content item;
   determining that the user is no longer present;
   sending an indication that the user is no longer present;
   receiving, based on sending the indication that the user is no longer present, an instruction to cease playback of the content item; and
   ceasing playback of the content item.

10. The method of claim 9, wherein determining the user information comprises one or more of facial recognition or voice analysis.

11. The method of claim 9, wherein determining that the user is no longer present comprises determining that one or more of facial information or voice information either does not match stored information or is unavailable.

12. The method of claim 9, wherein the content item is associated with one or more of video content, audio content, an image, or text.

13. The method of claim 9, wherein the playback of the content item comprises output of an audio signal.

14. The method of claim 13, wherein the output of the audio signal is based on a set of audio characteristics.

15. The method of claim 14, wherein the set of audio characteristics comprises at least one of, treble, bass, volume, equalization of frequencies and bands, or audio filters.

16. The method of claim 9, wherein initiating the playback of the content item comprises causing a display device to display the content item.

17. An apparatus, comprising:
   one or more processors; and
   memory storing processor executable instructions that, when executed by the one or more processors, cause the apparatus to:
      receive, from a first sensor, first user information;
      determine, based on the first user information, a content item;
      cause a first interface associated with the first sensor to initiate playback of the content item;
      receive, from a second sensor, second user information;
      cause, based on the second user information, the first interface to cease playback of the content item; and
      cause a second interface associated with the second sensor to resume playback of the content item.

18. The apparatus of claim 17, wherein one or more of the first user information or the second user information comprises one or more of facial information or voice information.

19. The apparatus of claim 17, wherein the content item is associated with one or more of video content, audio content, an image, or text.

20. The apparatus of claim 17, wherein the processor executable instructions, when executed by the one or more processors, further cause the apparatus to cause one or more of the first interface or the second interface to display the content item.

* * * * *